United States Patent
Hall et al.

(10) Patent No.: US 12,509,244 B2
(45) Date of Patent: Dec. 30, 2025

(54) AIR VEHICLE ASSEMBLY INITIALIZATION AND EJECTION

(71) Applicant: BAE SYSTEMS Information and Electronic Systems Integration Inc., Nashua, NH (US)

(72) Inventors: Matthew M. Hall, Nashua, NH (US); Michael E. Knotts, Milford, NH (US); Bernard A. Sacco, Westford, MA (US); Ross J. Wendell, Medford, MA (US); John A. Mitchell, Amherst, NH (US); John D. Chernick, Merrimack, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 5 days.

(21) Appl. No.: 18/612,033

(22) Filed: Mar. 21, 2024

(65) Prior Publication Data
US 2025/0296701 A1    Sep. 25, 2025

(51) Int. Cl.
  *B64F 1/04* (2024.01)
  *B64U 70/50* (2023.01)
  *F41F 1/00* (2006.01)

(52) U.S. Cl.
  CPC ............... *B64F 1/04* (2013.01); *B64U 70/50* (2023.01); *F41F 1/00* (2013.01)

(58) Field of Classification Search
  CPC ... B64F 1/04; B64U 70/50; F41F 1/00; B64D 1/02
  See application file for complete search history.

(56) References Cited

U.S. PATENT DOCUMENTS

| | | | | | |
|---|---|---|---|---|---|
| 3,839,940 | A | * | 10/1974 | Null | F42B 12/60 89/1.57 |
| 4,063,485 | A | * | 12/1977 | Carter | F41F 3/04 89/1.51 |
| 4,307,665 | A | * | 12/1981 | Block | F42B 12/70 342/12 |
| 5,413,024 | A | * | 5/1995 | Plummer | F41F 3/065 89/1.816 |
| 6,443,391 | B1 | | 9/2002 | Malejko et al. | |

(Continued)

FOREIGN PATENT DOCUMENTS

| | | | | | |
|---|---|---|---|---|---|
| CN | 112747632 A | * | 5/2021 | | F41F 1/00 |
| CN | 115406306 B | * | 2/2024 | | |

*Primary Examiner* — Benjamin P Lee
(74) *Attorney, Agent, or Firm* — Gary McFaline

(57) ABSTRACT

An air vehicle assembly initialization and ejection system includes a canister configured to contain an air vehicle assembly, where the air vehicle assembly includes an onboard electronic system and at least one squib for ejecting the air vehicle assembly from the canister. The system further includes a magazine having a canister position configured to contain the canister. The system further includes a first signal path providing electrical communication of a first control signal between the canister position and the canister, the first control signal for causing the onboard electronic system to power up, and a second signal path providing electrical communication of a second control signal between the canister position and the canister, the second control signal for causing the at least one squib to detonate.

20 Claims, 6 Drawing Sheets

(56) References Cited

U.S. PATENT DOCUMENTS

| | | | | |
|---|---|---|---|---|
| 7,293,492 | B2* | 11/2007 | Brunn | F42B 12/46 |
| | | | | 89/1.807 |
| 8,146,855 | B2* | 4/2012 | Ismailov | B64U 10/25 |
| | | | | 244/45 R |
| 8,528,863 | B2* | 9/2013 | Sanderson | B64U 70/50 |
| | | | | 244/49 |
| 9,470,477 | B2* | 10/2016 | Su | B64F 1/04 |
| 9,789,950 | B1* | 10/2017 | Most | B64U 70/50 |
| 9,873,526 | B2* | 1/2018 | Su | B64F 1/04 |
| 11,440,656 | B2* | 9/2022 | Smith | B64U 70/30 |
| 2006/0213492 | A1* | 9/2006 | Larcheveque | F41B 11/00 |
| | | | | 124/71 |
| 2012/0205488 | A1* | 8/2012 | Powell | B63G 8/30 |
| | | | | 244/63 |
| 2016/0347476 | A1* | 12/2016 | Andryukov | B64U 30/12 |
| 2017/0082397 | A1* | 3/2017 | Hester, Jr. | F41G 7/2293 |
| 2017/0233088 | A1* | 8/2017 | Homan | B64C 13/18 |
| | | | | 701/3 |
| 2019/0346241 | A1* | 11/2019 | Metz | B64U 70/83 |
| 2020/0108925 | A1* | 4/2020 | Smith | G05D 1/0094 |
| 2020/0398986 | A1* | 12/2020 | Toner | B64U 80/25 |
| 2021/0074449 | A1* | 3/2021 | Miremadi | F41F 3/04 |
| 2021/0107645 | A1* | 4/2021 | Izraelevitz | F42B 15/08 |
| 2022/0097867 | A1* | 3/2022 | Kuperman | F41F 3/042 |

* cited by examiner

AIR VEHICLE ASSEMBLY INITIALIZATION AND EJECTION

STATEMENT OF GOVERNMENT INTEREST

This invention was made with government support under prime contract number 21-C8099 awarded by the United States Government. The government has certain rights in the invention.

FIELD OF DISCLOSURE

The present disclosure relates to initialization and ejection of an air vehicle assembly from a dispensing platform.

BACKGROUND

An air vehicle assembly is a vehicle that is launched, or ejected, into flight (unpowered) from a terrestrial, marine, or airborne dispensing platform. The dispensing platform can detonate an explosive charge, referred to as a squib, such that the mechanical force of the detonation ejects the air vehicle assembly from the dispensing platform. The squib is typically mounted on the air vehicle assembly. In such an arrangement, the dispensing platform includes a hardware interface with the air vehicle assembly to provide a control signal for detonating the squib.

Figure 1:
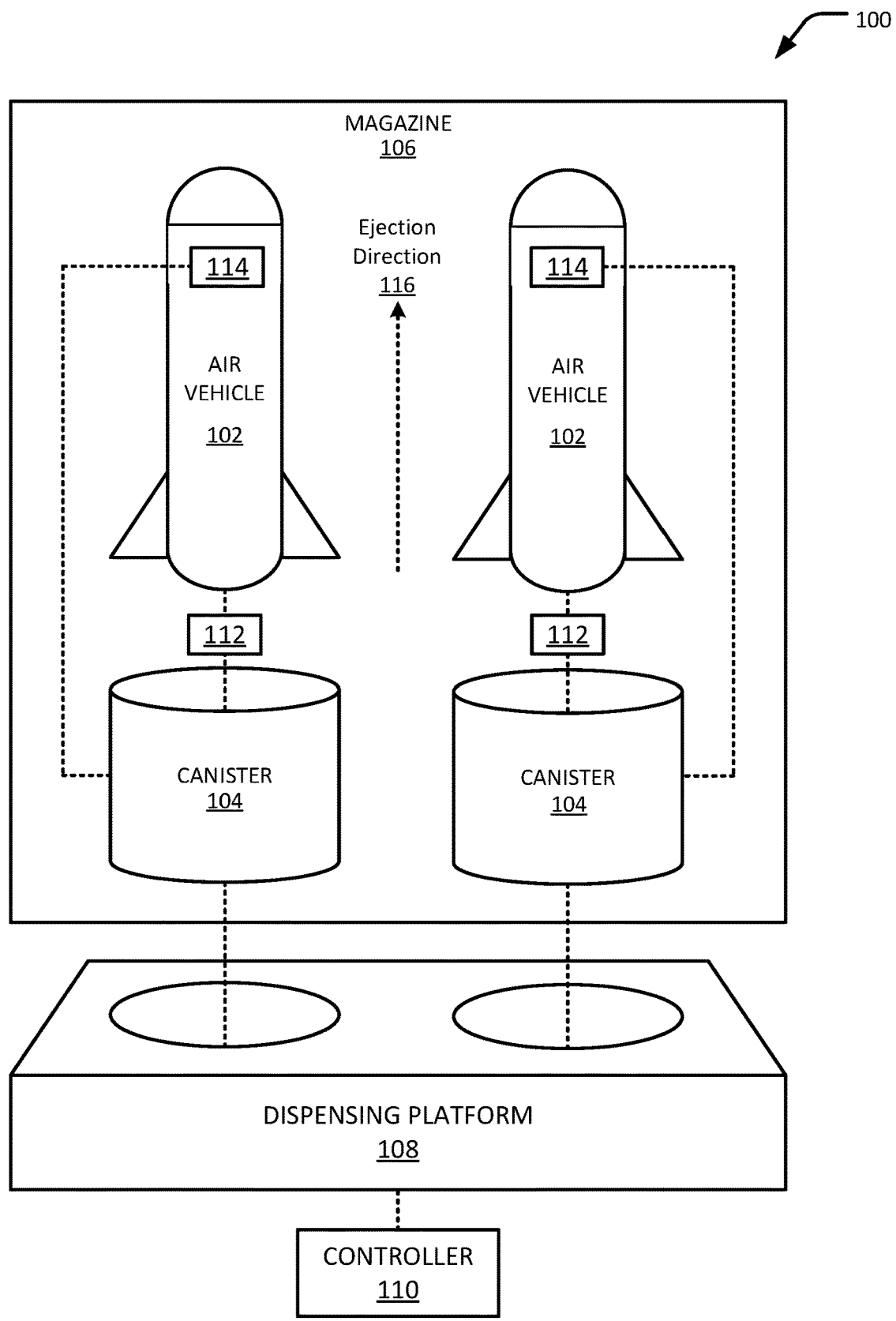
FIG. 1 is an exploded block diagram view of an air vehicle assembly initiation and ejection system, in accordance with an example of the present disclosure.

Although the following detailed description refers to illustrative examples, many alternatives, modifications, and variations thereof will be apparent in light of this disclosure.

DETAILED DESCRIPTION

An air vehicle assembly initialization and ejection system and related techniques are disclosed. The techniques allow for powering up an air vehicle assembly just prior to ejection from a given platform. The techniques can be integrated into an existing platform without extensive reconfiguration of existing hardware. In an example, the air vehicle assembly initialization and ejection system includes one or more canisters. Each canister can contain an air vehicle assembly. Each air vehicle assembly includes at least one squib for ejecting the air vehicle assembly from the corresponding canister, and an onboard electronic system. The air vehicle assembly initialization and ejection system further includes a magazine having several canister positions each configured to contain one of the canisters. The system further includes a first signal path providing electrical communication of a first control signal between one of the canister positions and the canister located in the corresponding canister position, and a second signal path providing electrical communication of a second control signal between the canister position and the canister located in the corresponding canister position. The first control signal causes the onboard electronic system to power up. The second control signal causes the squib to detonate. In some such examples, the first and second signal paths can be provided with an interface card or circuit board at the interface between the magazine and the canister. The first and second control signals can be generated via software executing on a controller. In such a case, the techniques require very little change to the hardware of an existing system.

In an example, one canister position is used for a canister for the air vehicle assembly. An existing air vehicle assembly ejection system design can be easily modified to use spare squib pin pairs for the first control signal to power up the onboard electronic system. In some examples, the onboard electronic system includes a latching circuit, a switch coupled to the latching circuit, an energy storage device coupled to one terminal of the switch, a power supply coupled to another terminal of the switch, and a microcontroller coupled to the power supply. The latching circuit (e.g., flip-flop based latch, or other electronic latch circuit) closes the switch (e.g., MOSFET, or other switch circuit) responsive to the first control signal, and the switch conducts power from the energy storage device to the power supply, thereby causing the microcontroller to become operational. Other devices included in the onboard electronic system may also be powered, such as an inertial measurement unit (IMU) coupled to the microcontroller. In this manner, the system can cause the onboard electronic system to power up prior to ejection of the air vehicle assembly from the canister. For instance, the air vehicle assembly can have one or more control surfaces controlled by the onboard electronic system for steering the air vehicle assembly in flight, or activate its IMU before being ejected from the platform in order to track attitude/orientation through the ejection event. In some such examples, for instance, the control actuation system can be powered up about 0.5 to 1 second before ejection to allow time for the IMU and microcontroller to boot up and initialize. Thus, powering up the onboard electronic system prior to ejection allows the system to activate the IMU and associated sensors to track its attitude/orientation through the ejection event. Other examples will be apparent in view of this disclosure.

Overview

As noted above, certain existing dispensing platforms include a controller and a hardware interface for detonating the squib aboard each air vehicle assembly. The dispensing platform may also have multiple interfaces such that each air vehicle assembly can be ejected independently of the others. Each interface includes electrical connections between the controller and the corresponding air vehicle assembly that detonate the squibs for ejecting the air vehicle assembly as well as to inventory the presence and/or status of the squibs prior to detonation. In addition to the squibs, the air vehicle assembly also include onboard electronic systems for performing various functions such as generating telemetry via an inertial measurement unit (IMU). The telemetry may, for example, maneuver the air vehicle assembly in flight. However, to conserve battery power, the onboard electronics of the air vehicle assembly remain unpowered until the squib detonates and ejects the air vehicle assembly from the dispensing platform. In such cases, a mechanical switch, an inertial igniter, an accelerometer, or other triggering mechanism located on the air vehicle assembly causes the onboard electronics to power up after the ejection event begins. The delay between the ejection event and the time the electronics become powered and operational can limit the ability of the electronics to perform certain functions such as telemetry and guidance, which may not be acceptable in some air vehicle assembly applications.

For instance, in certain applications, it is desirable to power on the air vehicle assembly electronic systems prior to ejection so that there is sufficient time for the boot up and initialization processes to complete prior to ejection but not so early so as to unnecessarily consume the limited available battery power. For example, if the electronics (e.g., IMU) track the attitude and/or orientation of the air vehicle assembly during and through the ejection event, then it would be beneficial to power up the electronics approximately one-half to one second prior to ejection (depending on initialization time needed for given IMU and/or processor).

However, existing designs do not provide the ability to power up the air vehicle assembly prior to ejection. For instance, legacy air vehicles include components, such as components that provide telemetry and/or guidance (e.g., an IMU), which receive power only after being ejected. Such an arrangement prevents a platform from determining the attitude and orientation of the vehicle prior to, or during, launch and adversely impacts the ability to control or operate the vehicle during launch. Furthermore, any modification of the existing (e.g., legacy) designs must take care not to impact or otherwise adversely affect the safety and control of the squibs. Thus, non-trivial challenges remain with respect to initializing and ejecting an air vehicle assembly from a dispensing platform.

Air Vehicle Assembly Initiation and Ejection System

Figure 2:
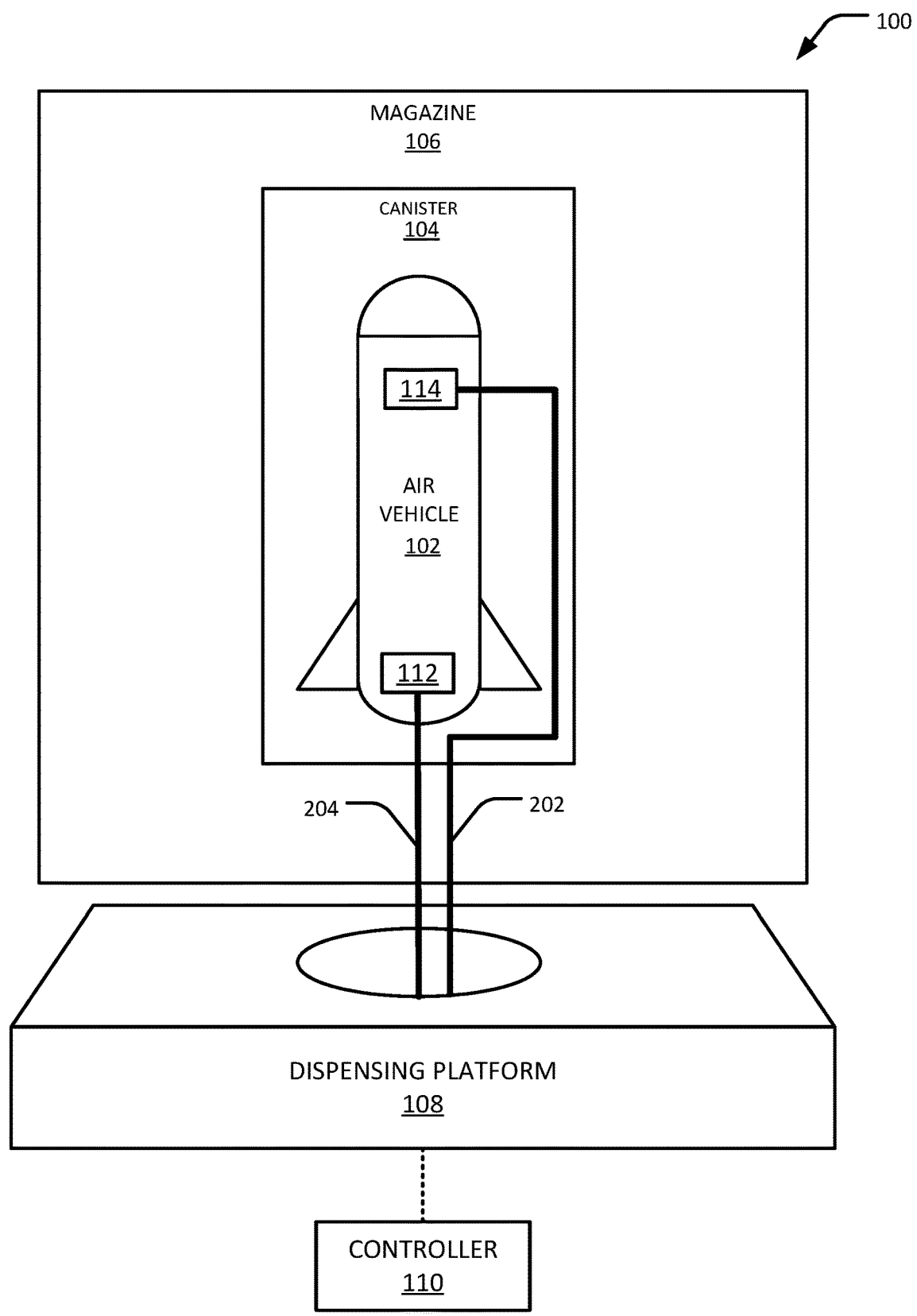
FIG. 2 is a block diagram of the air vehicle assembly initiation and ejection system of FIG. 1, showing the vehicle in canister along with control signal paths from controller to vehicle, in accordance with an example of the present disclosure.

FIGS. 1 and 2 are block diagrams of an air vehicle assembly initiation and ejection system 100, in accordance with an example of the present disclosure. The air vehicle assembly initiation and ejection system 100 includes at least one air vehicle assembly 102, at least one canister 104, a magazine 106, a dispensing platform 108, and a controller 110. Each air vehicle assembly 102 includes at least one squib 112 and an onboard electronic system 114.

In use, the canister 104 contains the air vehicle assembly 102, and the magazine 106 contains the canister 104. The magazine 106 can house any number of canisters 104 and air vehicle assemblies 102. The magazine 106 is coupled to the dispensing platform 108 (e.g., in the field), where the controller 110 causes ejection of the air vehicle assembly 102 from the canister 104. For example, the controller 110 can send a first control signal for activating the onboard electronic system 114 along a first signal path 202 via the magazine 106 and the canister 104, such as depicted in FIG. 2. Additionally, the controller 110 can send a second control signal for detonating the squib 112 along a second signal path 204 via the magazine 106 and the canister 104, such as depicted in FIG. 2. The detonation of the squib 112 ejects the air vehicle assembly 102 away from the canister 104 and the magazine 106 in the direction indicated at 116 in FIG. 1. The first signal path 202 is electrically isolated from the second signal path 204 and does not interface with the squib 112. Rather, the first signal path 202 is electrically coupled to the onboard electronic system 114.

In some examples, the first signal path 202 includes one or more cables or wires that are attached to an inside surface of the canister 104 and coupled to the onboard electronic system 114 via a severable electrical connection that severs when the air vehicle assembly 102 is ejected from the canister 104. The cables or wires are, for example, sealed to the canister 104 using Kapton® tape or another adhesive and electrically coupled to the dispensing platform 108 via one or more break-away pins or couplings.

In some other examples, the second signal path 204 includes one or more flexible cables or wires that are attached to an outer surface of the air vehicle assembly 102 and coupled to the squib 112 via a severable electrical connection (e.g., electrical pins at the bottom of the canister 104 and the air vehicle assembly 102) that severs when the air vehicle assembly 102 is ejected from the canister 104.

From the perspective of the controller 110, the first control signal emulates the second control signal (e.g., the first control signal emulates detonating the squib 112), but the controller 110 is configured (e.g., via software) to send the first control signal to the onboard electronic system 114 prior to the second control signal, thereby activating the onboard electronic system 114 prior to ejection of the air vehicle assembly 102. That is, the first control signal and the second control signal can both have similar or identical electrical characteristics (e.g., voltage pulses having a certain voltage, amperage, and duration). However, the first signal path 202 does not terminate at or otherwise contact the squib 112, and therefore the first control signal does not detonate the squib of any air vehicle assembly. Instead, the first control signal can, for example, cause a switch in the onboard electronic system 114 to close for connecting a source of power, such as a battery, to a microcontroller or other processing device, such as described with respect to FIG. 4.

In some examples, a retaining plate is used to interface the magazine 106 and the dispensing platform 108. The retaining plate can be integrated with or otherwise coupled to the magazine 106, in some such examples. Further details of the retaining plate are provided below with respect to FIGS. 5 and 6.

Air Vehicle Assembly

Figure 3:
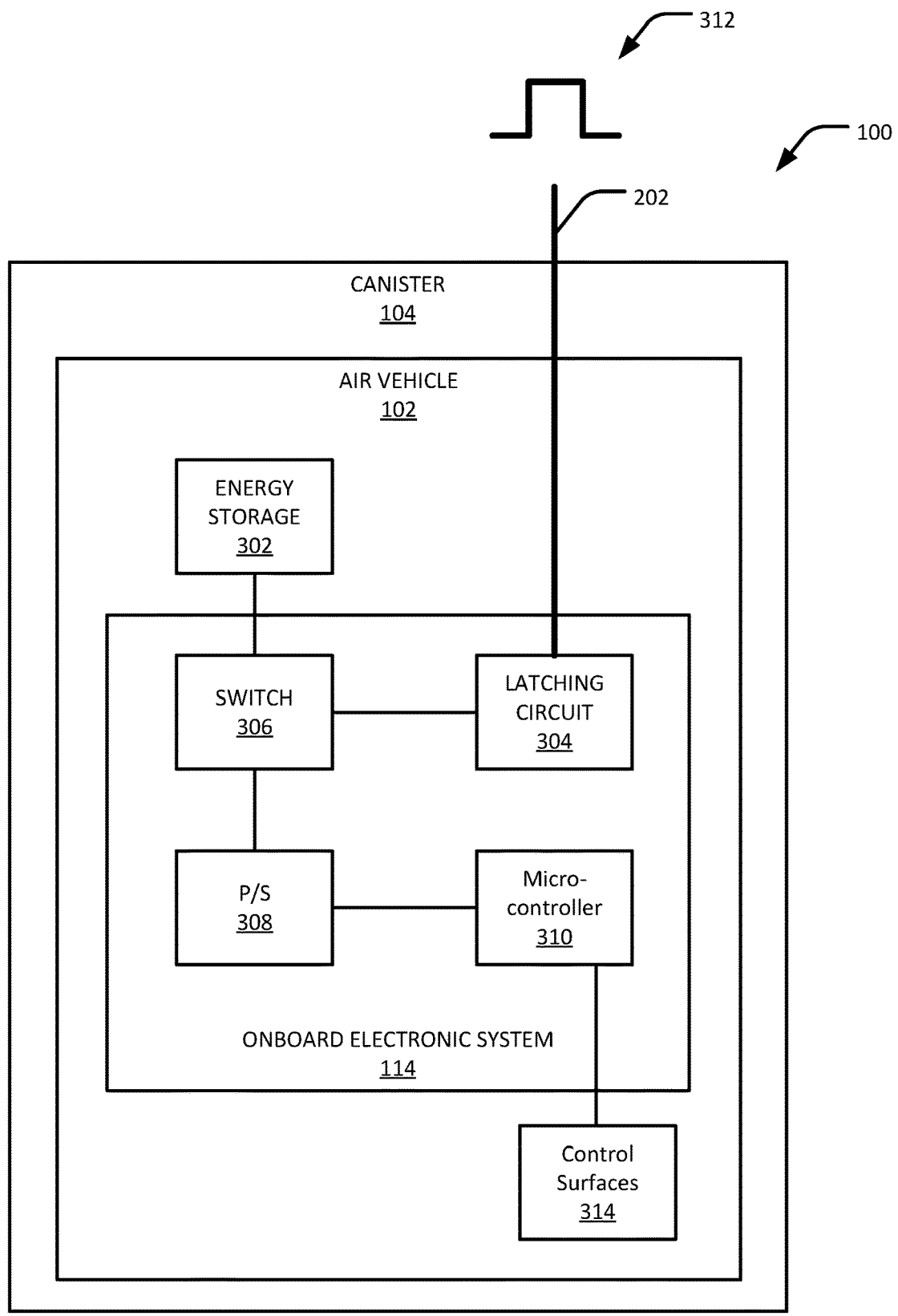
FIG. 3 is a schematic diagram showing further details of the air vehicle assembly initiation and ejection system of FIGS. 1 and 2, in accordance with an example of the present disclosure.

FIG. 3 is a block diagram of a portion of the air vehicle assembly initiation and ejection system 100 of FIGS. 1 and 2, in accordance with an example of the present disclosure. The air vehicle assembly 102 includes an energy storage device 302 (e.g., a battery, which may include a plurality of cells) for powering the onboard electronic system 114 and one or more control surfaces 314 (e.g., movable fins, flaps, or other devices that produce lift or drag) for steering the air vehicle assembly 102 in flight. The onboard electronic system 114 includes a latching circuit 304, a switch 306, a power supply 308, and a microcontroller 310. The onboard electronic system 114 controls steering of the air vehicle assembly 102 while in flight (e.g., during and after ejection from the canister 104).

In operation, the controller 110 provides a control signal 312 to the latching circuit 304 via the first signal path 202. The control signal 312 can include, for example, a 15 volt direct current (DC), 4.5 amp pulse of up to 20 milliseconds (these values are adjustable). The latching circuit 304 can be any electrical or electromechanical circuit (e.g., a relay or a set-reset circuit) that activates and locks its output for an indefinite time in response to the control signal 312.

The latching circuit 304, in turn, activates the switch 306, which couples the energy storage device 302 to the power supply 308 and conducts power from the energy storage device 302 to the power supply 308 and the microcontroller 310 for causing the microcontroller 310 to become operational. The switch 306 can be, for instance, a metal oxide semiconductor field effect transistor (MOSFET) having its gate terminal coupled to the latching circuit output, and its source drain terminals coupled between 302 and 308. Any other switch circuit that can be enabled to its closed position responsive to the latching circuit output signal may be used. The power supply 308 can be, for example, any power converter or voltage regulator that receives the incoming power from the energy storage device 302 and generates an output voltage that accommodates the operational power requirements of the onboard electronic system 114, such as the microcontroller 310 (e.g., providing the appropriate input voltage to operate the microcontroller 310). Other examples may not have a power supply 308, such as the case where energy storage 302 is coupled directly to microcontroller 310 (and other circuitry of 114) via switch 306. In any such cases, the controller 110 provides the control signal 312 to the air vehicle assembly 102 via the second signal path 204 to power up the onboard electronic system 114 separately from, and prior to, commanding the squib 112 to detonate.

The controller 110 is programmed or otherwise configured to provide the control signal 312 prior to ejection of the air vehicle assembly 102 from the canister 104; that is, prior to providing another control signal via the second signal path 204 to detonate the squib 112, thereby ejecting the air vehicle assembly 102 from the canister 104. The microcontroller 310, being operational prior to ejection, can, for example, generate telemetry for controlling the control surfaces 314 during the entire ejection event. In some examples, generating the control signal 312 prior to providing the control signal via the second signal path 204 to detonate the squib 112 can be accomplished by a software change or update to the microcontroller code of an existing system, such by defining a squib firing sequence.

In some examples, the latching circuit 304 includes a small resistance (e.g., a one ohm resistor) to provide a voltage for latching the switch 306 in a closed state. The resistance can also simulate the presence of a squib to the controller 110 when the controller 110 generates the control signal 312. This is useful, for example, when the controller 110 is polling the status of the squib 112 at each air vehicle assembly 102 prior to ejection, further improving the compatibility of the techniques provided herein with existing designs. For instance, and as described in further detail with respect to FIG. 5, certain signal paths between the controller 110 and the air vehicle assembly 102 utilize unused squib fire pins on the magazine 106. In this case, the controller 110 treats these signal paths as squib fire signal paths although they are not used to detonate squibs but are instead used to power up the onboard electronic system 114. The resistance in the latching circuit 304 thus simulates the presence of a squib where none exists to satisfy the polling process of the controller 110.

Control Signals

Figure 4:
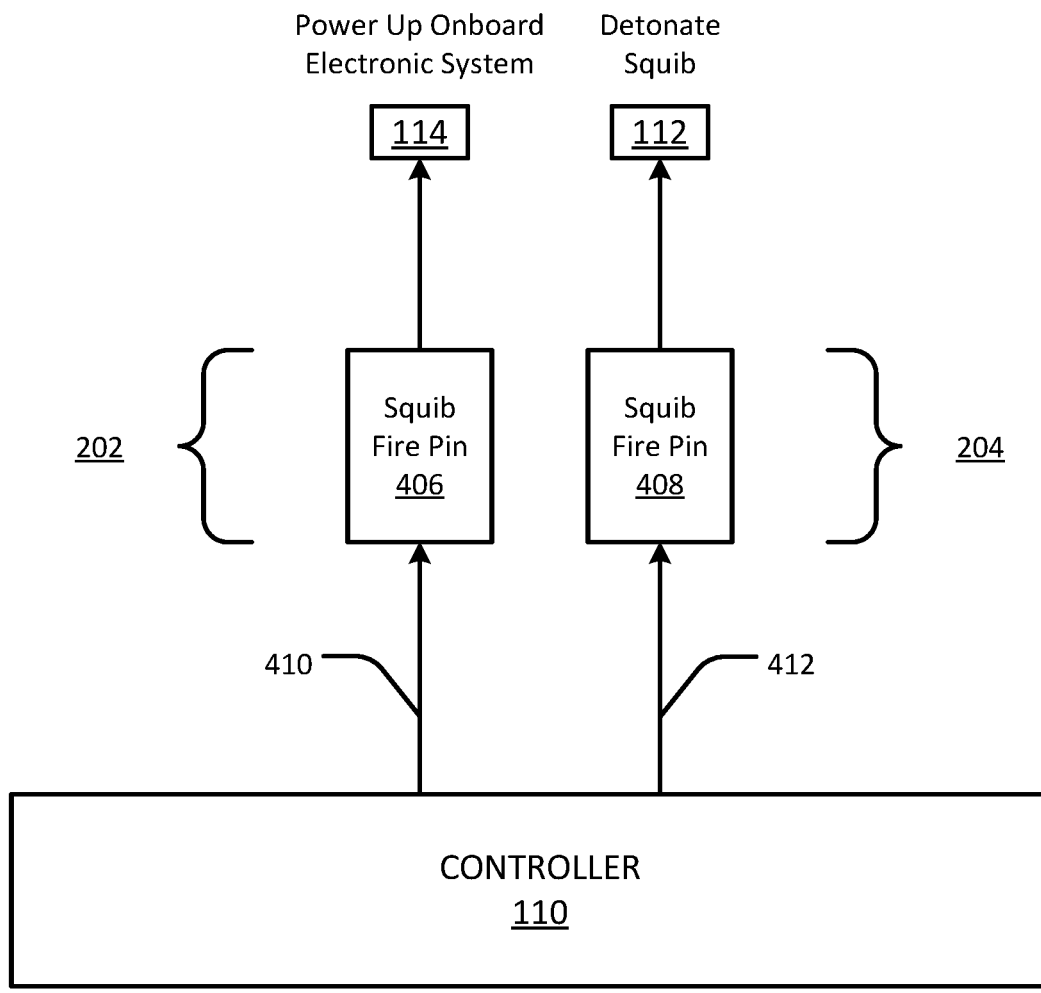
FIG. 4 is a schematic diagram of control signals of the air vehicle assembly initiation and ejection system of FIGS. 1-3, in accordance with an example of the present disclosure.
Figure 4:
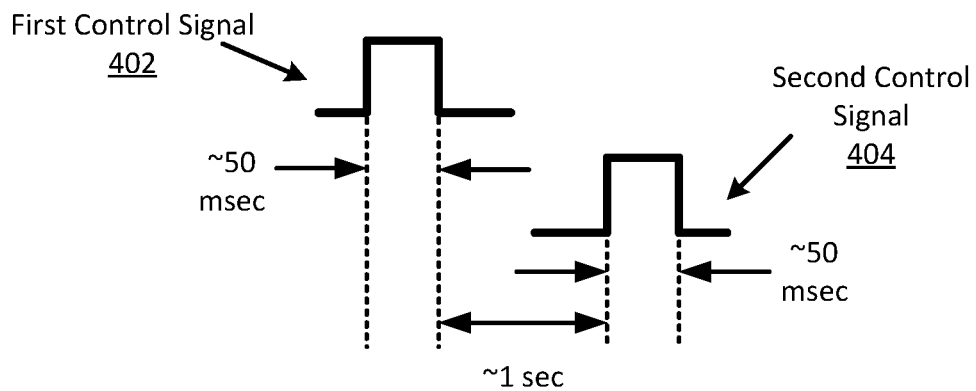

FIG. 4 is a schematic diagram of the control signals of the air vehicle assembly initiation and ejection system 100, in accordance with an example of the present disclosure. As noted above, the controller 110 powers up the onboard electronic system 114 of the air vehicle assembly 102 approximately just prior to ejecting the air vehicle assembly 102 from the canister 104 (e.g., within a second or two of ejection). Such timing helps to preserve onboard power in the energy storage device 302 prior to ejection.

To this end, the controller 110 generates a first control signal 402 and a second control signal 404. The first control signal 402 and the second control signal 404 are each pulses of approximately 15 volts DC at 6 amps with a duration of up to 50 milliseconds. The second control signal 404 occurs approximately one second after the first control signal 402.

The first control signal 402 passes to the onboard electronic system 114 via the first signal path 202, which can include a first squib fire pin 406 connected to a first output port 410 of the controller 110. The first squib fire pin 406 provides an electrical path between the magazine 106 and the canister 104 for the first control signal 402. The first control signal 402 powers up the onboard electronic system 114.

Similarly, the second control signal 404 passes to the squib 112 via the second signal path 204, which can include a second squib fire pin 408 connected to a second output port 412 of the controller 110. The second squib fire pin 408 provides an electrical path between the magazine 106 and the canister 104 for the second control signal 404. Note that there may be multiple squibs on the air vehicle assembly 102, and in such cases, there may be individual squib fire pins and individual control signals for each squib.

In some examples, the first signal path 202 and the second signal path 204 can also be used by the controller 110 to communicate with, or sense the state of, various components of the air vehicle assembly 102, such as the squib 112 and the onboard electronic system 114. For example, the controller 110 can confirm the inventory of air vehicle assemblies in the magazine 106 by applying 15 VDC at 100 milliamps periodically and looking for closed or open circuits, which indicate the presence or absence, respectively, of an air vehicle assembly at a particular position in the magazine 106.

Magazine Configuration

In some examples, the magazine 106 has positions for multiple canisters 104, e.g., a six-position magazine can support up to six air vehicle assemblies 102. Each magazine 106 provides three squib firing pin pair per canister 104, e.g., a six-position magazine includes 18 squib firing pin pairs, three for each air vehicle assembly 102. Each of the squib firing pin pairs are in electrical communication with an output port of the controller 110 via the dispensing platform 108. To facilitate the use of the first signal path 202 and the second signal path 204 for each air vehicle assembly, two squib firing pin pairs are used for each air vehicle assembly 102, such as shown in FIG. 4.

Figure 5:
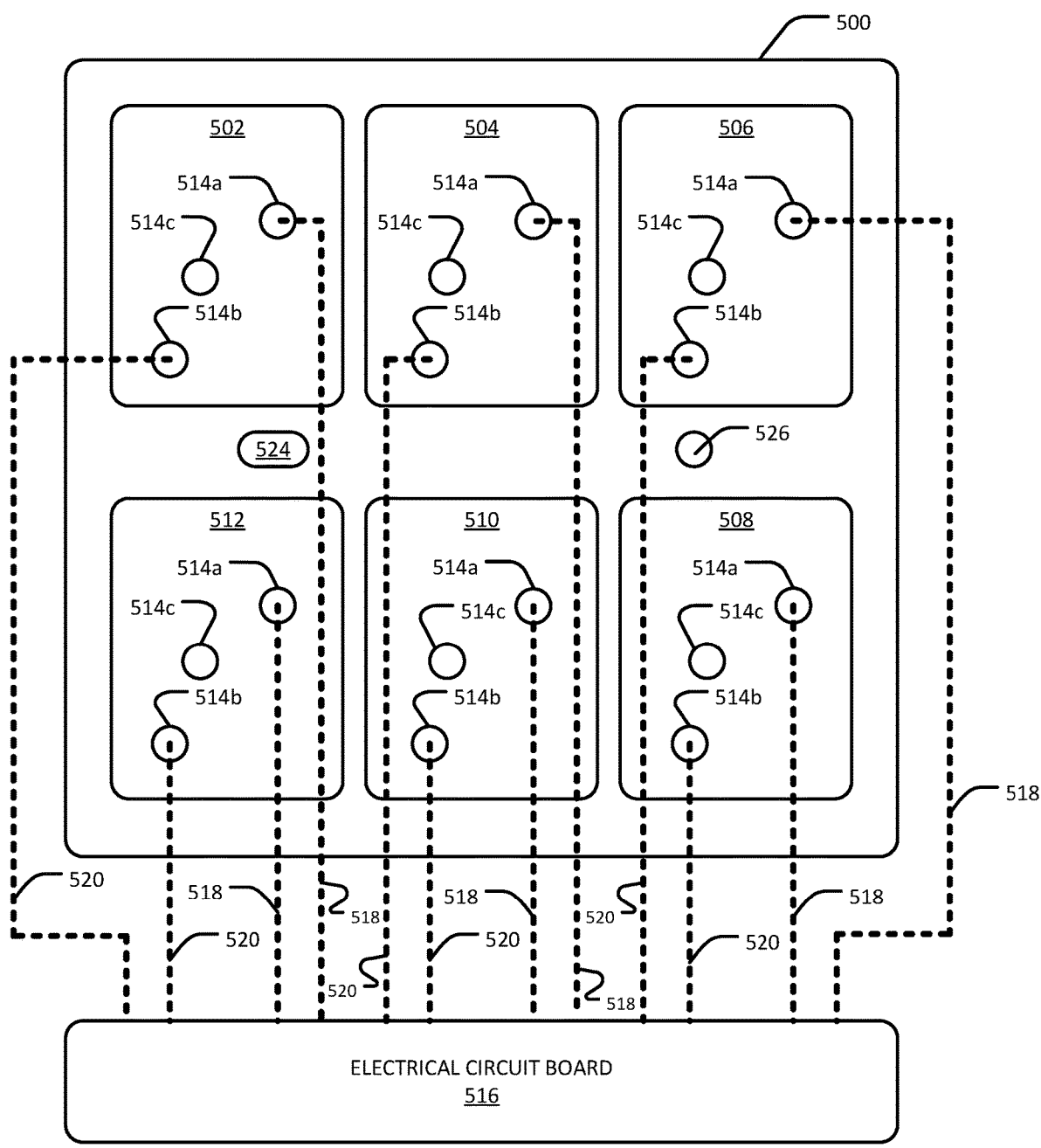
FIG. 5 is a schematical bottom view of a retaining plate for a magazine of the air vehicle assembly initiation and ejection system of FIGS. 1 and 2, in accordance with an example of the present disclosure.

FIG. 5 is a schematical bottom view of a retaining plate 500 for the magazine 106, in accordance with an example of the present disclosure. The retaining plate 500 is an interface between the magazine 106 and the dispensing platform 108. In some examples, the retaining plate 500 is a separate component from the magazine 106; however, it will be understood that the retaining plate 500 can be integrated into the magazine 106 without changing the theory of operation described herein.

The magazine 106 of this example has six canister positions, which correspond to positions 502, 504, 506, 508, 510 and 512 on the retaining plate 500. At each canister position are three squib firing pin pairs 514a, 514b, and 514c, which are each in electrical communication with the dispensing platform 108 via an electrical circuit board 516. In this example, the magazine 106 is coupled to an electrical circuit board that has two signal paths 518 and 520 per canister position. For instance, there is one signal path 518 between the electrical circuit board 516 and squib firing pin pair 514a at canister position 502 and another signal path 520 between the electrical circuit board 516 and squib firing pin pair 514b at canister position 504, as shown (each signal path includes a send and return). Each of the other canister positions 504, 506, 508, 510, and 512 have similar arrangements with signal paths 518, 520 between the electrical circuit board 516 and the squib firing pin pairs 514a, 514b.

The electrical circuit board 516 is an electrical interface between the magazine 106 and the dispensing platform 108. For example, for each of the canister positions 502, 504, 506, 508, 510, and 512 on the retaining plate 500, the electrical circuit board interfaces with squib firing pin pairs 514a and 514b at each position. (Squib firing pin pair 514c may be unused.) As noted with respect to the above example, the two signal paths 518 and 520 can be used for each air vehicle assembly 102: one for powering up the onboard electronic system 114 (e.g., signal path 520) and one for detonating the squib 112 (e.g. signal path 518).

In some examples, the magazine 106 includes an alignment feature 526, such as a key, pin, slot, or other mechanical structure, which ensures that the magazine 106 can be coupled to the dispensing platform 108 in only one orientation. For example, the alignment feature 526 corresponds with a portion of the structure of the dispensing platform 108 such that the magazine 106 and the dispensing platform 108, and the electrical circuit board 516 between them, can only be physically and electrically connected together in an arrangement, such as shown in FIG. 5, where the signal paths 518, 520 correspond to the squib firing pin pairs 514a and 514b, respectively, of all of the canister positions 502-512 to prevent misalignment or malalignment of the signal paths 518 and 520 with the electrical circuit board 516.

In some examples, the magazine 106 includes a sensing element 524 or other component that uniquely identifies the magazine 106 to the dispensing platform 108 as being in the configuration of FIG. 5 or a similar configuration where the canister positions (e.g., 502, 504, 506, 508, 510, and/or 512) are used for canisters where the squib firing pin pair 514a is used to fire the squib 112 and the squib firing pin pair 514b is used to power up the onboard electronic system 114. For example, the sensing element 524 can sense the presence of a magnet located on the magazine 106.

Figure 6:
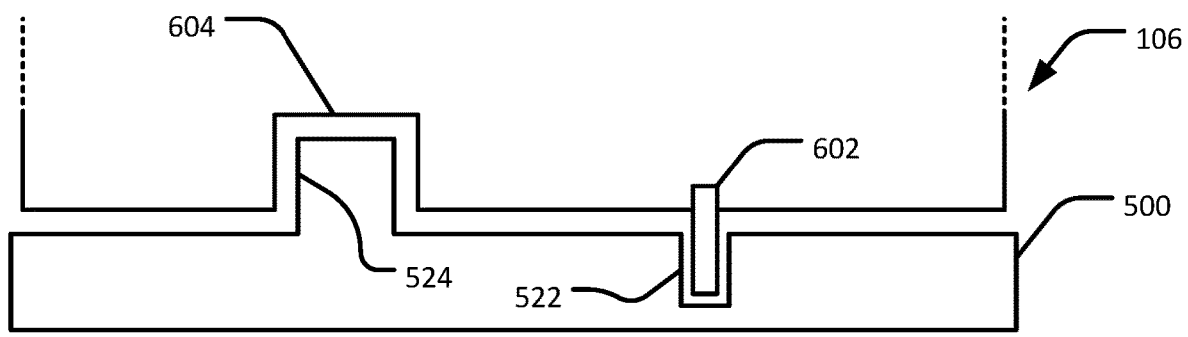
FIG. 6 is a cross-sectional side view of the retaining plate and the magazine of FIG. 5, in accordance with an example of the present disclosure.

FIG. 6 is a cross-sectional side view of the retaining plate 500 and the magazine 106, in accordance with an example of the present disclosure. In FIG. 6, the alignment feature 522 is a slot shown engaged with a pin 602 of the magazine 106. Also shown in FIG. 6 is a magnet 604 and the sensing element 524 of the retaining plate 500, where the magnet 604 is adjacent to the sensing element 524 when the magazine 106 is attached to the retaining plate 500.

Controller Configuration

Referring again to FIG. 5, recall that each of the squib firing pin pairs 514a (e.g., the second squib fire pin 408 of FIG. 4) of the canister positions 502, 504, 506, 508, 510, and/or 512 are in electrical connection with the respective squibs 112 of the air vehicle assemblies 102 via the second signal path 204. Each of the squib firing pin pairs 514b (e.g., the first squib fire pin 406 of FIG. 4) are in electrical communication with the respective onboard electronic systems 114 of the air vehicle assemblies 102 in the canister positions 502, 504, 506, 508, 510, and/or 512 via the first signal path 202.

From the perspective of the controller 110, the first control signal 402, which is used to apply power to the onboard electronic system 114, is the same as the second control signal 404, which is used to detonate the squib 112. Thus, no modification in signaling characteristics is needed other than the sequence in which the first control signal 402 and the second control signal 404 are asserted by the controller 110. For instance, as discussed with respect to FIG. 4, the timing of the first control signal 402, which travels via the first signal path 202 to the onboard electronic system 114, is different from the timing of the second control signal 404, which travels via the second signal path 204 to the squib 112.

In some examples, the controller 110 provides a custom squib firing order to achieve the timing of the first control signal 402 and the second control signal 404. The custom squib firing order can be provided in response to a determination that the magazine 106 contains air vehicle assemblies 102 which require their onboard electronic systems 114 to be powered up prior to ejection of the air vehicle assembly 102. Such a determination can be made, for example, using the sensing element 524 in conjunction with the magnet 604 to identify the magazine 106 as containing air vehicle assemblies that have such an operational requirement. The magnet 604 is sensed by the sensing element 524, which sends a signal to the controller 110. The controller 110 can be programmed to provide the custom squib firing order responsive to the signal from the sensing element 524.

When provided, the custom firing order simulates the delayed firing of two squib firing pin pairs for different air vehicle assemblies. However, one of the firing commands is used for actually detonating the squib 112 of one air vehicle assembly 102 and the other is used to power up the onboard electronic system 114 of the same air vehicle assembly 102. For example, the controller 110 generates the first control signal 402 at the squib firing pin pair 514b of canister position 502. Because the squib firing pin pair 514b is connected to the onboard electronic system 114, the first control signal 402 will not cause the detonation of any squibs at that position, even though the controller 110 treats the first control signal 402 as a squib firing command. Then, after a delay (e.g., approximately 0.5 to 1 second) with respect to the first control signal 402, the controller 110 generates the second control signal 404 at the squib firing pin pair 514a of canister position 502 (and in turn causes the squib 112 of the air vehicle assembly 102 at canister position 502 to detonate). Thus, the custom squib firing order causes the air vehicle assembly 102 to first power up and then eject from the canister 104 by sending two sequential squib firing commands to the same canister position. In this manner, no hardware modifications are needed for the magazine 106, as the custom squib firing order can be achieved in software within the controller 110 and is facilitated by the squib firing pin pairs 514a and 514b.

Table 1 provides a custom squib firing order with reference to FIG. 5, in accordance with an example of the present disclosure (AV=air vehicle assembly).

TABLE 1

| Air vehicle assembly | Event 1 | Event 2 | Event 3 | Event 4 |
|---|---|---|---|---|
| AV1 | Position 502 Squib Firing Pin Pair 514b | Power up AV 1 Delay 1 second | Position 502 Squib Firing Pin Pair 514a | Eject AV 1 |
| AV2 | Position 504 Squib Firing Pin Pair 514b | Power up AV 2 Delay 1 second | Position 504 Squib Firing Pin Pair 514a | Eject AV 2 |
| AV3 | Position 506 Squib Firing Pin Pair 514b | Power up AV 3 Delay 1 second | Position 506 Squib Firing Pin Pair 514b | Eject AV 3 |
| AV4 | Position 508 Squib Firing Pin Pair 514b | Power up AV 3 Delay 1 second | Position 508 Squib Firing Pin Pair 514b | Eject AV 4 |
| AV5 | Position 510 Squib Firing Pin Pair 514b | Power up AV 3 Delay 1 second | Position 510 Squib Firing Pin Pair 514b | Eject AV 5 |
| AV6 | Position 512 Squib Firing Pin Pair 514b | Power up AV 3 Delay 1 second | Position 512 Squib Firing Pin Pair 514b | Eject AV 6 |

In some examples, the controller 110 determines whether a malfunction occurs while performing the custom squib firing order, such as the failure of a squib 112 to detonate. For instance, the presence of a squib 112 can be detected by a small return current (the squib 112 provides approximately 1 ohm of resistance in the circuit). Since half of the squib firing commands are used to power up the air vehicle assemblies 102 and are not used to detonate any squibs, the first squib firing command may appear to the controller 110 as a misfire. To address this, the controller 110 can determine whether the malfunction occurs only after both the squib firing commands have been generated for each canister position 502, 504, and 506 (the positions having air vehicle assemblies 102).

Further Example Examples

The following examples pertain to further examples, from which numerous permutations and configurations will be apparent.

Example 1 provides an air vehicle assembly initialization and ejection system comprising a canister configured to contain an air vehicle assembly, the air vehicle assembly including an onboard electronic system and at least one squib for ejecting the air vehicle assembly from the canister; a magazine including a canister position configured to contain the canister; a first signal path providing electrical communication of a first control signal between the canister position and the canister, the first control signal for causing the onboard electronic system to power up; and a second signal path providing electrical communication of a second control signal between the canister position and the canister, the second control signal for causing the at least one squib to detonate.

Example 2 includes the subject matter of Example 1, comprising an electrical circuit board for conducting the first signal path from the magazine to the canister position and the canister.

Example 3 includes the subject matter of Example 2, wherein the magazine includes a retaining plate for interfacing the magazine to a dispensing platform, wherein the electrical circuit board is on the retaining plate.

Example 4 includes the subject matter of any one of Examples 1-3, wherein the second signal path is electrically isolated from the first signal path.

Example 5 includes the subject matter of any one of Examples 1-4, comprising a controller configured to provide the first control signal to the canister along the first signal path, and to provide the second control signal to the canister along the second signal path.

Example 6 includes the subject matter of Example 5, wherein the controller is further configured to provide the first control signal after providing the second control signal.

Example 7 includes the subject matter of any one of Examples 1-6, further comprising the onboard electronic system, wherein the onboard electronic system includes a latching circuit, a switch coupled to the latching circuit, a power supply coupled to the switch, and a microcontroller coupled to the power supply.

Example 8 includes the subject matter of Example 7, wherein the latching circuit is configured to close the switch responsive to the second control signal, and wherein the switch conducts power from an energy storage device to the power supply for causing the microcontroller to become operational.

Example 9 includes the subject matter of any one of Examples 1-8, wherein the air vehicle assembly includes an inertial measurement unit (IMU) configured to track attitude and orientation of the air vehicle assembly prior to and through an ejection event.

Example 10 includes the subject matter of Example 9, wherein the IMU is powered up responsive to the first control signal.

Example 11 includes the subject matter of any one of Examples 1-10, further comprising the air vehicle assembly.

Example 12 provides an air vehicle assembly comprising an onboard electronic system including a latching circuit, a switch coupled to the latching circuit, a power supply coupled to the switch, and a microcontroller coupled to the power supply; at least one squib for ejecting the air vehicle assembly from a canister; a first signal path providing electrical communication of a first control signal between the canister and the at least one squib; and a second signal path providing electrical communication of a second control signal between the canister and the onboard electronic system.

Example 13 includes the subject matter of Example 12, wherein the onboard electronic system is configured to be powered up responsive to the second control signal and prior to ejection of the air vehicle assembly from a canister.

Example 14 includes the subject matter of any one of Examples 12 and 13, wherein the latching circuit is configured to close the switch responsive to the second control signal, and wherein the switch conducts power from an energy storage device to the power supply, thereby causing the microcontroller to become operational.

Example 15 includes the subject matter of any one of Examples 12-14, wherein the at least one squib is configured to detonate responsive to the first control signal.

Example 16 includes the subject matter of any one of Examples 12-15, comprising an inertial measurement unit (IMU) configured to track attitude and orientation of the air vehicle assembly prior to and through an ejection event.

Example 17 provides an air vehicle assembly initialization and ejection system comprising a canister configured to contain an air vehicle assembly, the air vehicle assembly including an onboard electronic system and at least one squib for ejecting the air vehicle assembly from the canister; a magazine including a canister position configured to contain the canister; and a controller configured to provide a first control signal to the canister along a first signal path, and to provide a second control signal to the canister along a second signal path, the first signal path providing electrical communication of the first control signal between the canister position and the canister, the second signal path providing electrical communication of the second control signal between the canister position and the canister.

Example 18 includes the subject matter of Example 17, wherein the second control signal is delayed with respect to the first control signal, the second control signal configured to cause the at least one squib to detonate, and wherein the second control signal is configured to cause application of power to the onboard electronic system prior to squib detonation.

Example 19 includes the subject matter of any one of Examples 17 and 18, further comprising the onboard electronic system, wherein the onboard electronic system includes a latching circuit, a switch coupled to the latching circuit, a power supply coupled to the switch, and a microcontroller coupled to the power supply.

Example 20 includes the subject matter of Example 19, wherein the latching circuit is configured to close the switch responsive to the second control signal, and wherein the switch conducts power from an energy storage device to the power supply for causing the microcontroller to become operational.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be appreciated in light of this disclosure. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner and may generally include any set of one or more elements as variously disclosed or otherwise demonstrated herein.

What is claimed is:

1. An air vehicle assembly initialization and ejection system comprising:
    a canister configured to contain an air vehicle assembly, the air vehicle assembly including an onboard electronic system and at least one squib for ejecting the air vehicle assembly from the canister;
    a magazine including a canister position configured to contain the canister;
    a first signal path providing electrical communication of a first control signal between the canister position and the canister, the first control signal for causing the onboard electronic system to power up; and
    a second signal path providing electrical communication of a second control signal between the canister position and the canister, the second control signal for causing the at least one squib to detonate.

2. The system of claim 1, comprising an electrical circuit board for conducting the first signal path from the magazine to the canister position and the canister.

3. The system of claim 2, wherein the magazine includes a retaining plate for interfacing the magazine to a dispensing platform, wherein the electrical circuit board is on the retaining plate.

4. The system of claim 1, wherein the second signal path is electrically isolated from the first signal path.

5. The system of claim 1, comprising a controller configured to provide the first control signal to the canister along the first signal path, and to provide the second control signal to the canister along the second signal path.

6. The system of claim 5, wherein the controller is further configured to provide the first control signal after providing the second control signal.

7. The system of claim 1, further comprising the onboard electronic system, wherein the onboard electronic system includes a latching circuit, a switch coupled to the latching circuit, a power supply coupled to the switch, and a microcontroller coupled to the power supply.

8. The system of claim 7, wherein the latching circuit is configured to close the switch responsive to the second control signal, and wherein the switch conducts power from an energy storage device to the power supply for causing the microcontroller to become operational.

9. The system of claim 1, wherein the air vehicle assembly includes an inertial measurement unit (IMU) configured to track attitude and orientation of the air vehicle assembly prior to and through an ejection event.

10. The system of claim 9, wherein the IMU is powered up responsive to the first control signal.

11. The system of claim 1, further comprising the air vehicle assembly.

12. An air vehicle assembly comprising:
    an onboard electronic system including a latching circuit, a switch coupled to the latching circuit, a power supply coupled to the switch, and a microcontroller coupled to the power supply;
    at least one squib for ejecting the air vehicle assembly from a canister;
    a first signal path providing electrical communication of a first control signal between the canister and the at least one squib; and
    a second signal path providing electrical communication of a second control signal between the canister and the onboard electronic system.

13. The air vehicle assembly of claim 12, wherein the onboard electronic system is configured to be powered up responsive to the second control signal and prior to ejection of the air vehicle assembly from a canister.

14. The air vehicle assembly of claim 12, wherein the latching circuit is configured to close the switch responsive to the second control signal, and wherein the switch conducts power from an energy storage device to the power supply, thereby causing the microcontroller to become operational.

15. The air vehicle assembly of claim 12, wherein the at least one squib is configured to detonate responsive to the first control signal.

16. The air vehicle assembly of claim 12, comprising an inertial measurement unit (IMU) configured to track attitude and orientation of the air vehicle assembly prior to and through an ejection event.

17. An air vehicle assembly initialization and ejection system comprising:
  a canister configured to contain an air vehicle assembly, the air vehicle assembly including an onboard electronic system and at least one squib for ejecting the air vehicle assembly from the canister;
  a magazine including a canister position configured to contain the canister; and
  a controller configured to provide a first control signal to the canister along a first signal path, and to provide a second control signal to the canister along a second signal path, the first signal path providing electrical communication of the first control signal between the canister position and the canister, the second signal path providing electrical communication of the second control signal between the canister position and the canister.

18. The system of claim 17, wherein the second control signal is delayed with respect to the first control signal, the second control signal configured to cause the at least one squib to detonate, and wherein the second control signal is configured to cause application of power to the onboard electronic system prior to squib detonation.

19. The system of claim 17, further comprising the onboard electronic system, wherein the onboard electronic system includes a latching circuit, a switch coupled to the latching circuit, a power supply coupled to the switch, and a microcontroller coupled to the power supply.

20. The system of claim 19, wherein the latching circuit is configured to close the switch responsive to the second control signal, and wherein the switch conducts power from an energy storage device to the power supply for causing the microcontroller to become operational.

* * * * *